July 31, 1956  A. C. HARTLEY ET AL  2,756,873
APPARATUS FOR LAYING SUBMARINE CABLES
Filed May 4, 1954  5 Sheets-Sheet 1

INVENTORS
A. C. Hartley and
R. J. Ashby
BY John A. Seifert
ATTORNEY

July 31, 1956
A. C. HARTLEY ET AL
2,756,873
APPARATUS FOR LAYING SUBMARINE CABLES
Filed May 4, 1954
5 Sheets-Sheet 2
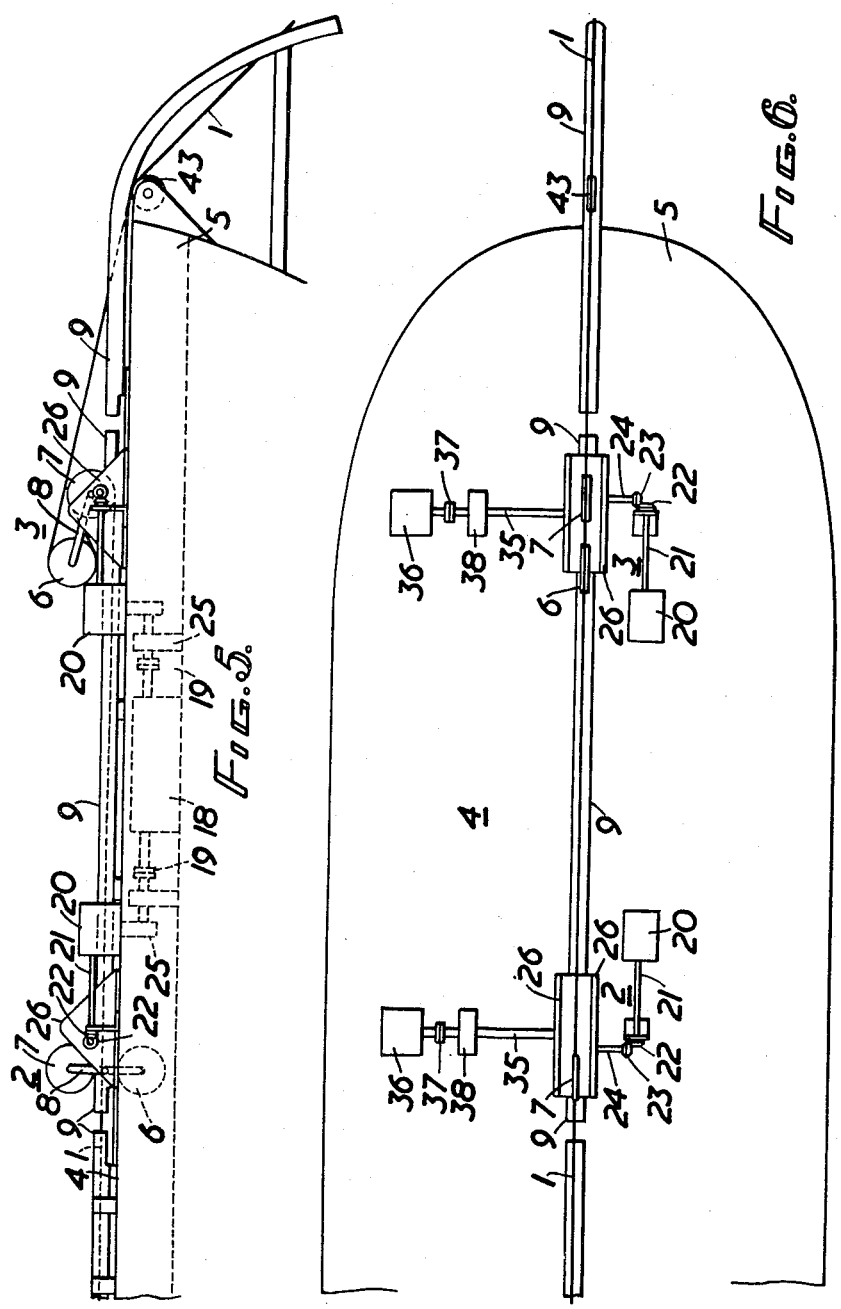
INVENTORS
A. C. Hartley and
R. J. Ashby
BY John A. Seifert
ATTORNEY INVENTORS
A. C. Hartley and
R. J. Ashby
BY John A. Seifert
ATTORNEY July 31, 1956   A. C. HARTLEY ET AL   2,756,873
APPARATUS FOR LAYING SUBMARINE CABLES Filed May 4, 1954   5 Sheets-Sheet 5

INVENTORS
A. C. Hartley and
R. J. Ashby
BY John A. Seifert
ATTORNEY

United States Patent Office 2,756,873
Patented July 31, 1956

2,756,873

APPARATUS FOR LAYING SUBMARINE CABLES

Arthur Clifford Hartley, West Byfleet, and Ronald Joseph Ashby, Orpington, England, assignors to Johnson & Phillips Limited, London, England Application May 4, 1954, Serial No. 427,502

Claims priority, application Great Britain May 13, 1953

15 Claims. (Cl. 203—40)

This invention relates to apparatus for holding, braking, winding or paying out cables, hawsers, threads or the like which have solid articles connected at intervals therealong, and has particular, though not exclusive reference to apparatus for holding, braking, winding or paying out, from cable-laying ships, cables which have solid repeaters connected at intervals therealong.

In prior copending application Serial No. 419,467 filed March 29, 1954, in the name of Arthur Clifford Hartley, an apparatus of the above character is described which, inter alia, enables submarine cables, which have solid repeaters connected at intervals therealong, to be payed out from cable-laying ships, without the usual delay, which at present is necessitated, each time a repeater has to be dealt with. The present invention has for its object the provision of an improved apparatus which is somewhat similar to the said apparatus of application Serial No. 419,467, and which inter alia obviates certain disadvantages of the said apparatus of application Serial No. 419,467.

The invention consists broadly of a winch for controlling the longitudinal movement of a cable, thread or like flexible lead, at an intermediate point of the path thereof, which lead has connected in it a given point of its length, a solid object which is movable along a supporting track, comprising first and second pulleys relatively movable to and from an inoperative correlation at which they are on opposite sides of said track, so that said lead and said solid object may pass freely along said track between said pulleys, and an operative correlation at which they take up said lead one on each side thereof, so that said lead makes a part turn round both of them in series, said first pulley, at said operative correlation, having crossed said track so that said pulleys are on the same side of said track, and said second pulley at said operative correlation being substantially tangential or at least close to the path of said track, with the portion of said lead which extends externally of the winch from said second pulley extending straight, or nearly straight, along said track, and means for controlling the rotation of at least one of said pulleys, and thereby, when said pulleys are at the operative correlation, controlling the longitudinal movement of said lead.

In order that the invention may be the more clearly understood, an apparatus in accordance therewith, for holding, braking, winding and paying out, from a cable-laying ship, submarine cables having solid repeaters connected at intervals therealong, will now be described, reference being made to the accompanying drawings wherein:

Figure 5 is a less diagrammatic side elevation showing the apparatus at the position of Figure 2;

Figure 6 is a plan of the apparatus of Figure 5;

Figure 1:
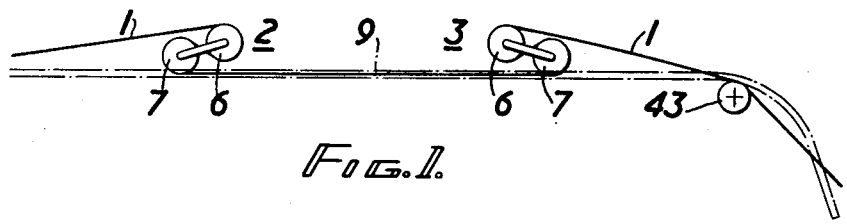
Figure 1 is a diagrammatic side elevation of the apparatus when at the normal position for paying out the cable from the ship.

Referring to the drawings, the cable 1, during the normal paying out operation, is controlled by means of two winches 2 and 3, spaced apart longitudinally on the ship's deck 4, between the ship's hold (not seen), in which the cable is stored, and the stern 5 of the ship, over which the cable passes into the sea. Each of these winches 2 and 3 consists of two sheaves 6 and 7 mounted on one frame 8, with their axes horizontally athwartships, and with the sheaves themselves in a common vertical plane which is longitudinal of the ship. The frame 8 is movable as will hereinafter appear but the sheaves always remain in the same plane.

When the cable 1 is being payed out during normal operation, it passes aft as best shown in Figure 1, along a horizontal track 9 on the deck of the ship towards the forward winch 2, and, as it approaches said forward winch, it inclines upwards leaving said track 9 and passes over the top of the sheave 6 of said forward winch. This sheave 6 is above, and to the aft of the sheave 7 and the cable 1 makes rather more than a half turn round said sheave 6 and then runs forward and at an angle upwards and passes over the top of the sheave 7 round which it makes rather more than half a turn and then extends horizontally aftwards again. It is now back at the original level and is once more in the track 9.

Said cable continues aftwards in the track 9 until it passes under the sheave 7 of the aft winch 3. It then makes rather more than half a turn round said sheave 7; then runs forward and at an angle downwards to the underside of the sheave 6 of said aft winch; then makes more than half a turn round the sheave 6 and then runs aftwards and at an angle downwards till it is again within the track 9. Subsequently as will hereinafter appear it passes over the stern 5 of the ship into the sea.

The two sheaves 6 and 7 of each winch are geared together so as to rotate in unison in opposite directions and their rotation is controlled, as will hereinafter appear. Owing to the convolutions of the cable 1 in passing round the sheaves 6 and 7, each winch is capable of supporting without slip a cable tension at the outlet which is many times that at the inlet, and it will therefore be seen that the tension of the cable where it passes into the sea can be easily supported by the winches, and the cable can be payed out in a controlled manner. During the paying out operation the cable passing into the sea is under a high tension and the sheaves of both winches are controllably braked.

Figure 2:
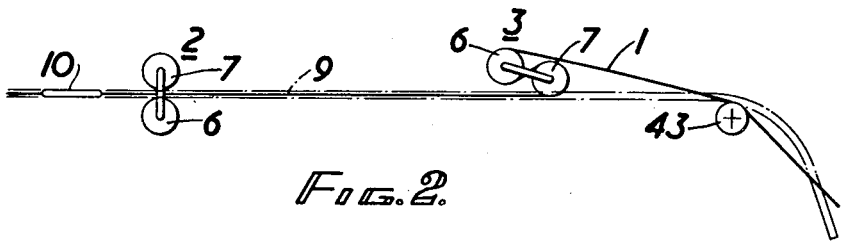
Figure 2 is a similar view to Figure 1 showing the apparatus during the first stage of the paying out of a repeater.

When the time approaches for a repeater to pass from the ship's hold into the sea, the frame of the forward winch is rotated about the axis of the sheave 7 (counterclockwise as seen in Figure 1) so that the sheave 6 moves round the sheave 7 first forwards, then downwards, then aftwards. When said sheave 6 has described rather more than half a circle and before it is vertically beneath the sheave 7, the frame 8 changes its axis of rotation and now rotates about an axis mid-way between the sheaves. Rotation about this last axis continues until the sheave 6 is vertically beneath the sheave 7, and, during this rotation, the sheave 7 will be displaced upwardly and forwardly as the sheave 6 is displaced downwardly and rearwardly, and the sheave 7 will therefore be a little above the track 9. The sheave 6 will be right below the track 9 having passed through an opening in the track as will be hereinafter more particularly described. The cable 1 will have been unwound from both sheaves and will be in the track just beneath the sheave 7. The position is now as in Figure 2.

The cable 1 now continues to be payed out by the aft winch 3 alone. At the appropriate moment the repeater 10 is manipulated into the forward end of the track 9 and it simply passes aft along said track and underneath the sheave 7 of the forward winch which is sufficiently raised to clear it. When the repeater is fully clear of said forward winch, the frame 8 of said forward winch is rotated back to the operative position of Figure 1, rotating first about the axis which is mid-way between the sheaves, and then about the axis of the sheave 7, in the reverse way to when rotating from the operative to the inoperative position. In rotating back to the operative position the sheaves will pick up the cable 1 as before. The position is now as in Figure 3.

Figure 3:
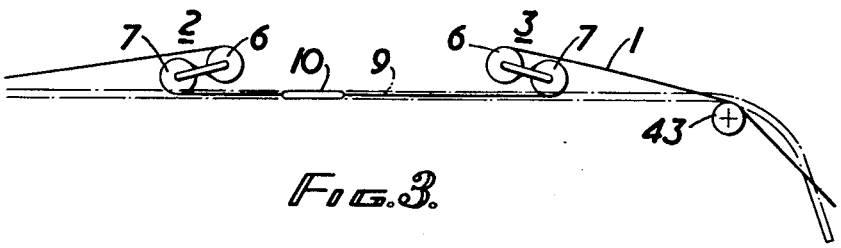
Figure 3 is a similar view showing the apparatus at the next stage of the paying out of the repeater.
Figure 4:
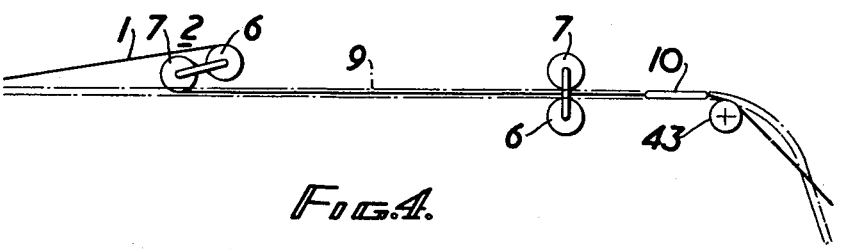
Figure 4 is a similar view showing the apparatus at the final stage of the paying out of said repeater.

When the cable 1 is again being held by the fore winch 2, the aft winch 3 is rotated to its inoperative position, just as the fore winch 2 was. That is to say the frame 8 of the aft winch is rotated (clockwise as seen in Figure 3), first about the axis of the sheave 7, the sheave 6 moving first aft, then downwards, then forwards, and next about the axis between the sheaves until the sheave 6 is vertically beneath the sheave 7, and the sheave 7 has been raised above the track 9. The paying out of the cable 1 is now continued by the fore winch 2 alone, until the repeater 10, still moving along the track 9 has passed beneath the sheave 7 of the aft winch 3 (as shown in Figure 4) and has been delivered into the sea, as will appear hereinafter. The aft winch 3 is then rotated back to the operative position of Figure 1, its sheaves again picking up the cable, and the normal paying out is then continued as before by both winches.

It will be seen that, throughout the whole operation, the repeater 10 is pulled straight through along the track 9 and the cable both to the aft and the fore of the repeater is lying straight in the track. This is because each winch, at its operative position, has its sheave 7 substantially tangential on its lower side to the centre line of the track. Thus, when the repeater 10 is being pulled aft by the after winch 3 as in Figure 2, the cable pulling it will be lying straight in the track, and when said repeater has passed to the aft of the forward winch 2 and said forward winch has been returned to the operative position as in Figure 3, the cable both fore and aft of the repeater will be lying straight along the track, and finally when the aft winch has been moved to its inoperative position and the repeater is being payed out solely by the forward winch 2 the cable to the fore of the repeater is lying straight along the track. The cable to the aft of said repeater is also lying straight along the track right up to the point where the repeater is diverted for delivery into the sea as will hereinafter appear.

Figure 7:
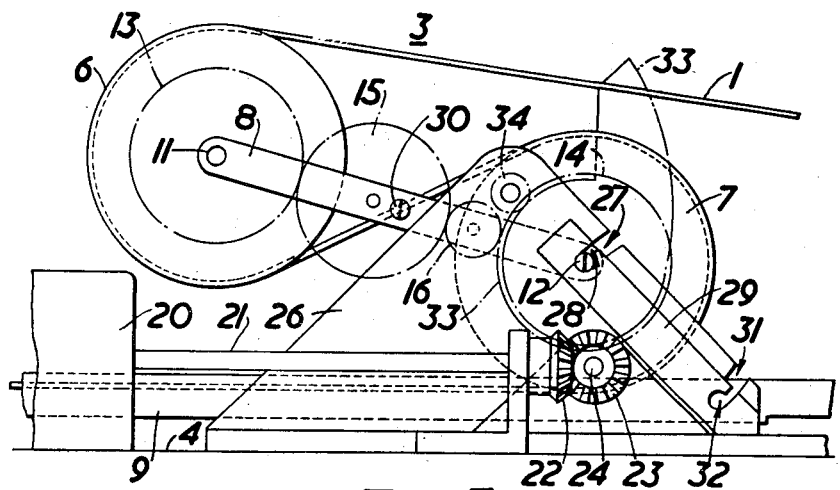
Figure 7 is a view to a larger scale of a winch comprised in the apparatus, said winch being in the operative position.
Figure 8:
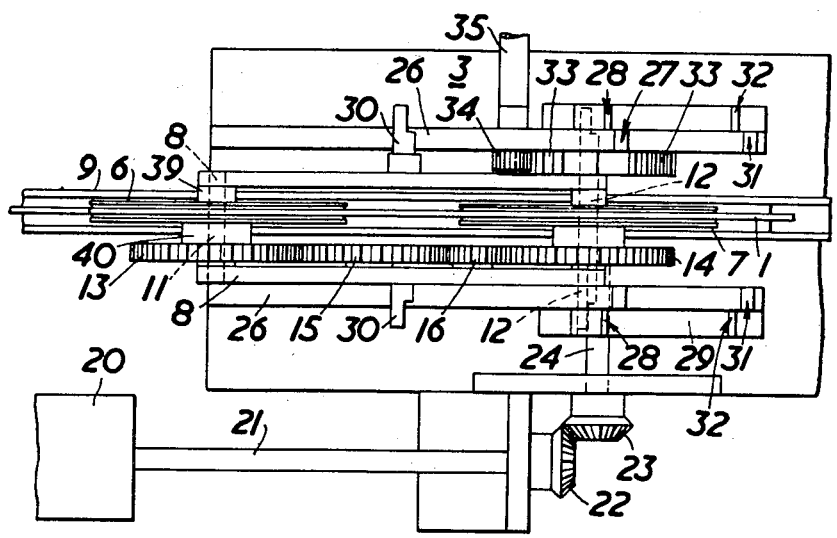
Figure 8 is a plan of said winch.

The frame 8 of each winch consists of two parallel elongated side plates, as shown in Figures 7 and 8, joined by transverse axles 11 and 12 at their two ends. The two sheaves 6 and 7 rotate respectively on said axles 11 and 12. For gearing said sheaves 6 and 7 together, said sheaves are fast with respective gear wheels 13 and 14 and said gear wheels 13 and 14 are geared together by means of a gear train consisting of gear wheels 15 and 16 mounted on one of the side plates of the frame 8.

When either winch is at its operative position, the gear wheel 14 is in mesh at its underside with a pinion 17. The pinions 17 of the two winches are adapted to be driven by a common prime mover 18 through individual clutches 19 and individual gear boxes 20, the driven shaft 21 of each gear box being coupled to the respective pinion 17 by means of bevel gears 22 and 23 respectively on said shaft 21 and the shaft 24 of the pinion 17. As shown somewhat diagrammatically in Figure 5, a hydraulic brake 25 is provided between each clutch 19 and the respective gear box 20.

It will thus be seen that, when either winch is at the operative position it can be positively driven in either direction by the common prime mover 18 or it can be braked by its hydraulic brake 25. When, however, either winch is shifted into its inoperative position shown in Figure 11, the gear wheel 14 is raised out of engagement with the pinion 17 so that the sheaves 6 and 7 are uncoupled both from any source of power and from any braking means.

Figure 11:
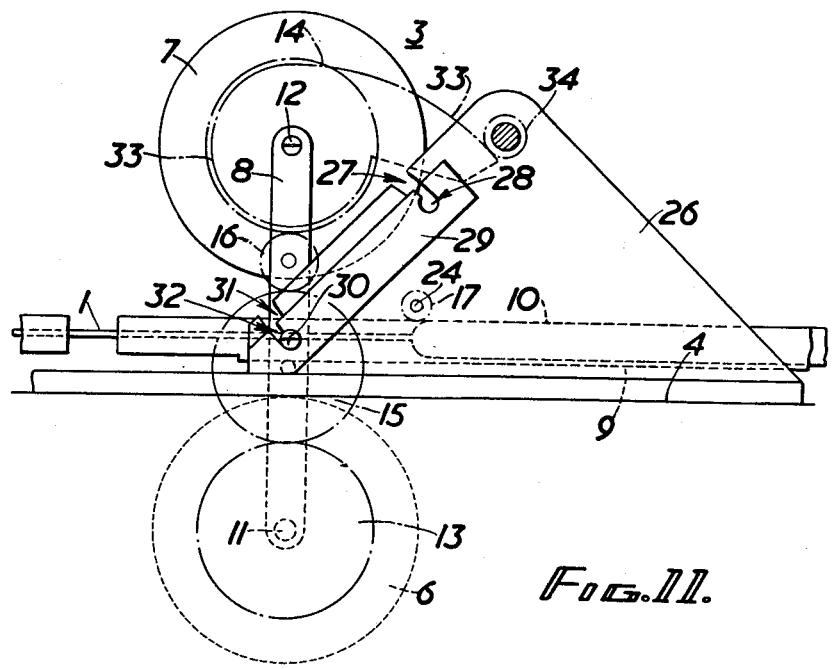
Figure 11 is a similar view to Figures 9 and 10, but showing the winch at the inoperative position.

For mounting the frame 8 of each winch, a bracket is provided comprising two massive fixed supporting plates 26 spaced apart in vertical planes extending fore and aft. The axle 12, on which the sheave 7 is mounted, extends, at each end, beyond the side plates forming the frame 8 as shown in Figures 7 and 8, and, when the winch is at its operative position, the extending portions of this axle rest in notches 27 in the edges of these fixed supporting plates 26. The extreme end portions of said axle 12 are cut away to semi-cylindrical shape and these end portions rest in notches 28 formed in the edges of elongated plates 29 secured to the outside surfaces of the supporting plates 26. When the frame 8 is rotated to the inoperative position, the said axle 12 simply rotates in these notches 27 and 28 for the first part of the rotation of the frame, and, at the termination of this first part of the rotation, studs 30, which project outwards from the centre of the two side plates of the frame 8, engage in another pair of notches 31 in the edges of the supporting plates. The extreme end portions of the studs 30 are also cut away to semi-cylindrical shape and these end portions rest in notches 32 formed in the edge of the elongated plates 29. When the studs 30 are fully home in these notches 31 and 32, continued rotation of the frame 8 causes the frame to rotate about said studs 30 in these notches 31 and 32, and the ends of the axle 12 of the sheave 7 are lifted clear of the notches 27 and 28 as shown in Figure 11. The return movement is of course the reverse of this movement.

Figure 9:
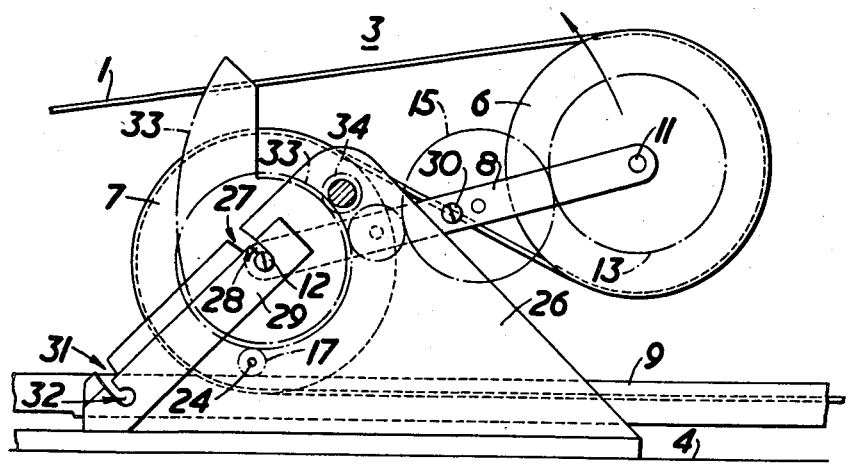
Figure 9 is a side elevation of the same but viewed from the other side from that of Figure 7.
Figure 10:
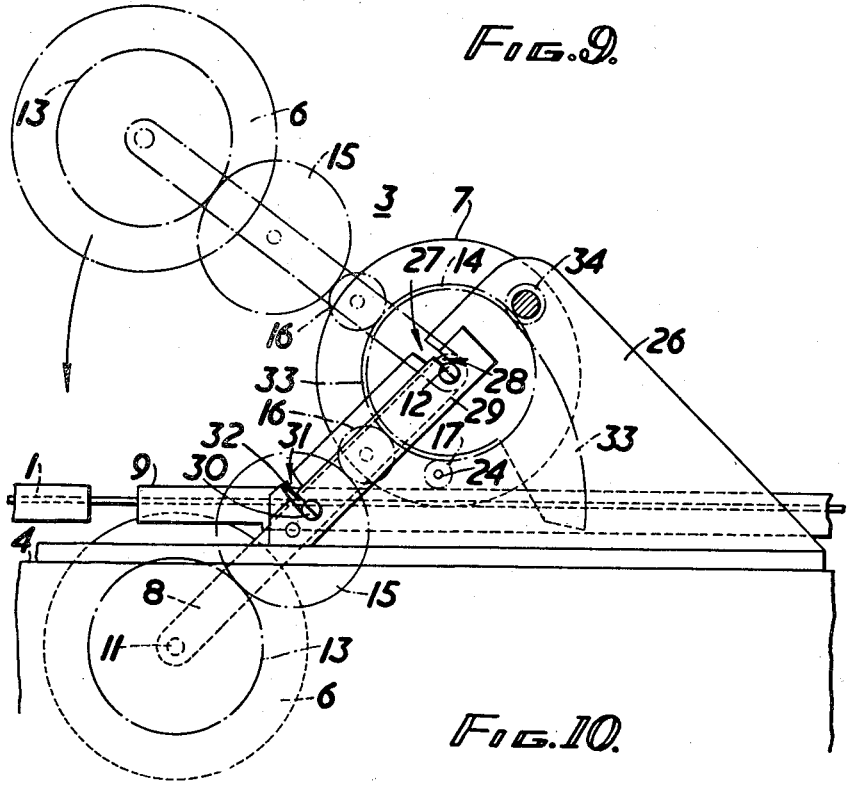
Figure 10 is a similar view to Figure 9 but showing the winch in two successive intermediate positions between its operative and its inoperative position.

The purpose of the semi-cylindrical end portions of the axle 12 and the studs 30 engaging respectively in the notches 28 and 32, is in order positively to prevent said axle and studs being inadvertently lifted from their notches 27, 28 and 31, 32. Thus it will be seen that each notch 28 is relatively narrow at its mouth and has a larger circular portion at its inner end. When the frame 8 is at the lower dotted line position shown in Figure 10, at which the axle 12 is in engagement with the notches 27, 28 and the studs 30 are also in engagement with the notches 31, 32, the semi-cylindrical end portions both of the axle 12 and of the studs 30 are turned to such an angle that either of them can be withdrawn through the narrow mouth of the notch 28 or 32 as the case may be. Thus, from the lower position of Figure 10, rotation of the frame can be effected either to the position of Figure 11 or back to the operative position of Figure 6. At the operative position of Figure 9, however, the semi-cylindrical end portions of the axle 12 are turned to a position such that they cannot be withdrawn from the notches 28, and, in like manner, at the inoperative position of Figure 11, the semi-cylindrical end portions of the studs 30 are turned to a position such that they cannot be withdrawn from the notches 32.

For effecting the said rotary movement of the frame 8 of each winch, the said frame has fast with it a toothed rack 33. This rack throughout the major part of its extent is curved to the arc of a circle which is concentric with the axis of the sheave 7. Throughout the remainder of its extent, said rack is curved to the arc of a circle which is concentric with the studs 30 which project from the centre of the side plates of the frame. Said rack is in engagement with a pinion 34 and the arrangement is such that rotation of said pinion 34 rotates the frame 8 about the axis of the sheave 7, with the axle 12 in its notches 27 and 28 when said pinion is in engagement with the said first part of the rack 33, and about the axis of the central studs 30, with said studs in their notches 31 and 32, when said pinion 34 is in engagement with the second part of the rack 33. Said pinion 34 is mounted on a shaft 35 which is driven by a prime mover 36 through the medium of a clutch 37 and a gear box 38, the prime mover and gear box being mounted on the ship's deck, as shown in Figure 6.

Figure 12:
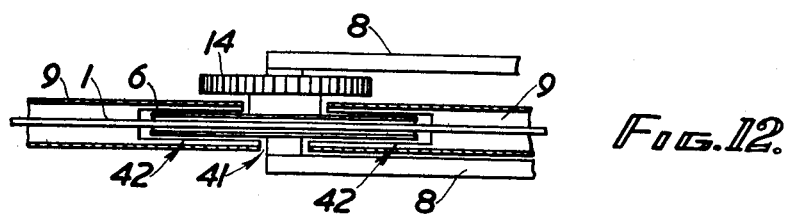
Figure 12 is a sectional plan showing a portion of the winch at one stage between its operative and inoperative positions.

The track 9 may be in the form of a tube with a longitudinal slot along its top to enable the cable 1 to pass upwards from it to the sheaves 6 during normal paying out. It will be understood that, at this normal paying out stage, the lower portions of the sheaves 7 extend down through this longitudinal slot to the interior of the track, so as to be substantially tangential to the centre line of said track as heretofore stated. It will be seen from Figure 8 that one of the side plates of the frame 8 is immediately to one side of the track 9 and that the gear wheels 13, 15, 16, 14 are immediately to the other side. Therefore, when either winch is moved to its inoperative position, only the sheave 6 and its axle 11 (including a spacing element 39 on said axle and a boss 40 which joins said sheave 6 to the gear wheel 13) have to pass through the track. The passing of said sheave and axle through the track is illustrated in Figure 12 and it will be seen that the track only has to be divided by a short gap 41 which gives passage way to the axle. A longitudinal slot 42 also has to be made through the bottom of the track to give passage way to the sheave. Neither the gap 41 nor the slot 42 interferes with the smooth passage of the repeater along the track.

There must also, of course, be a hole in the ship's deck to enable the sheave 6 and the lower part of the frame 8 to pass through.

The track 9 continues aft beyond the after winch 3 and extends beyond the stern 5 of the ship where, as clearly shown in Figures 5 and 6, it curves downwards on a smooth curve to a position where it may be fairly near the surface of the water. Each repeater 10 therefore simply passes along the track and slides out of the rear end thereof into the sea. Outboard from the stern of the ship, immediately beneath the track, at about the point where the track commences to curve downwards, is a large sheave 43 in a vertical plane which rotates about a horizontal axis. From this point to its rear end, the track is formed with a longitudinal slot along its underside, and the upper portion of said sheave 43 is just in the beginning of this slot. The cable 1, during normal paying out will pass over this sheave 43 and through the under slot direct into the sea as shown. When a repeater 10 arrives it will pass above the sheave 43 to the rear end of the track, with the cable 1 to the aft of it passing through the under slot into the sea until the repeater emerges from the track. The cable 1 to the fore of the repeater 10 will run on the sheave 43, passing through the under slot, as the cord of an arc, to the repeater so long as the same is in the track, and passing through the under slot straight to the sea after the repeater has entered the sea. Thus the cable 1 can never be abraded against the rearwardly projecting portion of the track.

The sheaves may be provided with detachable segment rims having different V notches in order to accommodate different thicknesses and styles of cable. It will be seen that, in the case of the forward winch 2 the heaviest maximum cable tension is supported by the sheave 7 and that, in the case of the aft winch 3 the heaviest maximum cable tension is supported by the sheave 6. In order therefore to avoid damage to the cable the sheave 7 of the forward winch 2 is given a flatter groove than the sheave 6, and the sheave 6 of the aft winch 3 is given a flatter groove than the sheave 7. In this way the sheave which supports the greatest cable tension has the smallest multiplication factor (i. e. ratio of outlet tension to inlet tension) and in this way the cable suffers the least damage.

It will have been understood that during normal paying out operation the clutches 19 will be at the disengaged position and each winch will be braked by its hydraulic brake 25. The hydraulic brakes are of course variable and are adjusted to give the required rate of pay out. They can also be actuated to bring the cable to a dead stop and it may be found necessary to actuate the brake 25 of the aft winch 3 to the stop position to stop the repeater 10 at the position of Figure 3 while the forward winch 2 is moved to its operative position and then to maintain the cable stopped by the brake 25 of the forward winch 2 while the aft winch 3 is moving to its inoperative position. It is believed, however, that it will be possible so to time the movement of the winches that the repeater can be passed right through both winches and into the sea without the cable being stopped at all. Obviously, by employing electric motors as the prime movers 36, and controlling said motors automatically according to the position of the repeater the whole operation of paying a repeater through the winches could be made automatic.

The prime mover 18 is normally necessary only during the starting and finishing of a cable-laying operation when the cable needs to be manipulated in various ways. When this prime mover is in operation the clutches 19 are of course engaged and the brakes 25 are at the free position.

In accordance with a modification of the invention, the axis of the sheave 7 could be fixed and the movement of the carrier 8 to and from the operative to the inoperative positions could be solely a rotary movement round said axis. Said sheave 7 would be as close as possible to the path of the track without obstructing the repeater. Thus when the winch is at the operative position said sheave, although not tangential to the path of the track would be nearly so, and the cable leaving said sheave would be very nearly along the line of the track, and the repeater would be pulled and payed out by cable extending nearly straight along the line of the track. Such an arrangement would be less perfect than the one illustrated and heretofore described, but it might be practicable at least in some cases.

Again the movement of the carrier 8 to and from the operative and the inoperative positions could be solely about an axis located between the axes of the sheaves but quite close to the axis of the sheave 7. In this way, it could be arranged so that, at the inoperative position, said sheave 7 is sufficiently far from the path of the track not to obstruct the repeater, and, at the operative position, it is just tangential to the path of the track as in the arrangement illustrated. This would, however, involve the complication that the sheave 7 would have to cross the track, at least partially during the movement between said operative and inoperative positions.

According to a still further modification of the invention the frame 8 of each winch could be rotated by a steel cable instead of by the rack 33 and pinion 34. The steel cable would make a turn round a groove or track associated with one of the plates which form the frame 8, and its two ends would go to respective hydraulic rams. By pulling in one end of said cable the frame would be rotated in one direction, and, by pulling in the other end, said frame would be rotated in the other direction. The hydraulic rams would be in hydraulic communication with each other, so that, as one pulls the cable in, the other pays it out, and there is no slack in the cable. The path of the track is of course suited to the axis or axes about which the frame 8 rotates.

It is not of course necessary to employ both winches during the normal paying out operation, but the normal paying out may be effected by one or the other of said winches at different times.

Equipment according to the present invention might be fitted to cable-laying ships in which the cable payed out did not have any solid repeater connected in it. It is clear that the appended claims cover any such equipment, as the same would be capable of paying out a cable with a repeater connected in it, even if it did not in fact do so.

We claim:
1. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof, so that said lead makes a part turn around both of them in series, said first pulley, at said operative position, having crossed said track so that said pulleys are on the same side of said track, and said second pulley at said operative position being substantially tangential to the path of said track, with the portion of said lead which extends externally of the winch from said second pulley extending substantially straight along said track, and means for controlling the rotation of at least one of said pulleys.

2. A winch according to claim 1, wherein said track is of tubular form and has a longitudinal slot in the top of its wall to enable said lead to extend between said track and said first pulley when said carrier is at the operative position.

3. A winch according to claim 2, wherein said track is divided to enable the axle of said first pulley and said first pulley itself to cross said track.

4. Apparatus for controlling the longitudinal movement of a flexible lead which has a solid object connected in it at a given point of its length, comprising two winches according to claim 1 arranged in spaced relation with their tracks together forming one continuous track, said winches being so arranged that, when their carriers are at their operative positions, the portion of the lead between them extends direct between the second pulleys thereof and therefore extends substantially along the track, whereby when said solid object is to be moved along said track, it is possible by actuating the carrier of one winch to the non-operative position to pull said solid object aft along said track by the lead lying substantially in said track and controlled by the other winch, and when said solid object has reached a position between said winches by then actuating the carrier of said one winch to the operative position and the carrier of said other winch to the non-operative position to pay out said solid object aft along said track by the lead lying substantially in said track and controlled by said one winch.

5. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof, so that said lead makes a part turn of more than two right angles around both of them in series, said first pulley, at said operative position, having crossed said track so that said pulleys are on the same side of said track, and said second pulley at said operative position being substantially tangential to the path of said track, with the portion of said lead which extends externally of the winch from said second pulley extending substantially straight along said track, and means for controlling the rotation of at least one of said pulleys.

6. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof, so that said lead makes a part turn around both of them in series, said first pulley, at said operative position, having crossed said track so that said pulleys are on the same side of said track, and said second pulley at said operative position being substantially tangential to the path of said track, with the portion of said lead which extends externally of the winch from said second pulley extending substantially straight along said track, means gearing said pulleys together to rotate in opposite directions, and means for controlling the rotation of said pulleys.

7. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof, so that said lead makes a part turn around both of them in series, said first pulley, at said operative position, having crossed said track so that said pulleys are on the same side of said track, and said second pulley at said operative position being substantially tangential to the path of said track, with the portion of said lead which extends externally of the winch from said second pulley extending substantially straight along said track, a gear train gearing said pulleys together to rotate in opposite directions, said gear train including a gear wheel fast with said second pulley, a pinion which rotates about a fixed axis, said gear wheel being adapted to mesh with said pinion only at the operative position of said carrier, and means for controlling the rotation of said pinion and thereby of said pulleys.

8. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof so that said lead makes a part turn around both of them in series, said first pulley, at said operative position, having crossed said track so that said pulleys are on the same side of said track, and said second pulley at said operative position being substantially tangential to the path of said track, with the portion of said lead which extends externally of the winch from said second pulley extending substantially straight along said track, a source of power for rotating at least one of said pulleys, and a brake for exercising a braking drag on at least one of said pulleys.

9. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track so that said lead and said solid object may pass freely along said track between said pulleys, to an operative position at which said pulleys take up said lead one on each side thereof so that said lead makes a part turn around both of them in series, said second pulley, during rotation of said carrier from said non-operative to said operative position, remaining close to said track on the same side thereof, and said first pulley crossing said track, so that said pulleys are both on the same side of said track at said operative position, said second pulley at said operative position being substantially tangential to the path of said track, with the portion of the lead which extends externally of the winch from said second pulley extending substantially straight along said track, and means for controlling the rotation of at least one of said pulleys.

10. A winch for controlling a longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof so that said lead makes a part turn around both of them in series, said second pulley, during rotation of said carrier from said non-operative to said operative position, moving towards said track until it is substantially tangential to the path thereof with the portion of the lead which extends externally of the winch from said second pulley extending substantially straight along said track, and said first pulley, during rotation of said carrier from said non-operative to said operative position crossing said track, so that said pulleys are both on the same side of said track at said operative position, and means for controlling the rotation of at least one of said pulleys.

11. A winch for controlling the longitudinal movement of a flexible lead, at an intermediate point of the path thereof, which lead has connected in it at a given point of its length, a solid object, comprising a supporting track for said solid object, first and second pulleys, a common carrier rotatable on two axes and on which carrier said pulleys are rotatably mounted in a common plane, means for rotating said carrier successively on said axes from a non-operative position, at which said pulleys are on opposite sides of said track, so that said lead and said solid object may pass freely along said track between said pulleys, to an operative position at which said pulleys take up said lead one on each side thereof, so that said lead makes a part turn around both of them in series, the major part of the rotary movement of said carrier from said non-operative to said operative position being a rotation about the axis of said second pulley so that said first pulley crosses said track and said pulleys are on the same side of said track at said operative position, and the remainder of said rotary movement of said carrier from said non-operative to said operative position being a rotation about an axis between said pulleys, whereby said second pulley moves towards said track until, at said operative position, it is substantially tangential to the path thereof, with the portion of the lead which extends externally of the winch from said second pulley extending substantially straight along said track, and means for controlling the rotation of at least one of said pulleys.

12. A winch for controlling the longitudinal movement of a flexible lead at an intermediate point of the path thereof, which lead has connected in it at a given point of its length, a solid object, comprising a supporting track for said solid object, first and second pulleys, a common carrier on which said pulleys are rotatably mounted in a common plane, a first stationary bearing, a second stationary bearing, said carrier having a non-operative position, at which it is mounted in said first stationary bearing for rotation about a first axis intermediate between and parallel to the axis of said pulleys, with said pulleys on opposite sides of said track, so that said lead and said solid object may pass freely along said track between said pulleys, means for rotating said carrier from said non-operative position to an operative position at which said pulleys take up said lead one on each side thereof, so that said lead makes a part turn around both of them in series, the first part of such rotation of said carrier being a rotation about said first axis, and continuing to a given point at which said second pulley has moved towards said track until it is substantially tangential to the path thereof, with the portion of said lead which extends externally of the winch from said second pulley extending substantially along said track, and at which said carrier is mounted for rotation in said second stationary bearing about a second axis coincident with the axis of said second pulley, and the second part of such rotation of said carrier being a rotation about said second axis and continuing to the operative position of said carrier, at which said first pulley has crossed the track and is at the same side thereof as said second pulley, and means for controlling the rotation of at least one of said pulleys.

13. A winch according to claim 12, and comprising a plate on each side of the track and each plate arranged with notches which constitute said first and second stationary bearings, and axles mounted on said carrier to mate with said notches.

14. A winch according to claim 13, said notches and axles being so formed that said carrier cannot depart from said first stationary bearing until it is mounted on said second stationary bearing and vice versa.

15. A winch according to claim 12, and comprising a toothed rack fast with said carrier and a power driven pinion in mesh with said rack, said rack, for part of its extent being on the arc of a circle about said first axis and for the remainder of its extent being on the arc of a circle about said second axis, whereby rotation of said pinion effects rotation of said carrier about said two axes in succession.

References Cited in the file of this patent

FOREIGN PATENTS

| | | |
|---|---|---|
| 448,630 | France | Sept. 24, 1912 |
| 601,925 | France | Dec. 11, 1925 |
| 694,195 | France | Sept. 15, 1930 |
| 636,595 | Germany | Oct. 12, 1936 |
| 723,811 | Germany | Aug. 11, 1942 |